United States Patent [19]

Menke et al.

[11] Patent Number: 4,740,562
[45] Date of Patent: Apr. 26, 1988

[54] METHOD FOR THE SURFACE MODIFICATION OF OBJECTS MADE OF POLYVINYLIDENE FLUORIDE

[75] Inventors: Klaus Menke, Bruchsal; Klaus Wollmann, Limburg-Eschhofen; Gerhard Glink, Offenbach, all of Fed. Rep. of Germany

[73] Assignee: agru Alois Gruber & Sohn oHG, Bad Hall, Austria

[21] Appl. No.: 865,781

[22] Filed: May 22, 1986

[30] Foreign Application Priority Data

Jun. 7, 1985 [DE] Fed. Rep. of Germany ....... 3520302
Jan. 30, 1986 [DE] Fed. Rep. of Germany ....... 3602800

[51] Int. Cl.$^4$ ................................................. C08F 8/00
[52] U.S. Cl. .................................. 525/366; 525/326.4; 525/369
[58] Field of Search ............................. 525/366, 369

[56] References Cited
U.S. PATENT DOCUMENTS
3,067,078 12/1962 Gluck ..................................... 154/43

OTHER PUBLICATIONS

Journal of Polymer Science: Polymer Chemistry Edition, vol. 23, 1057–1061 (1985).
Chemical Abstracts, vol. 76, 73362y, p. 44 (1972).
Chemial Abstracts, vol. 104, 226087m, p. 60 (1986).
Journal of Polymer Science, (1984) pp. 1057 to 1061.
Macromelcules, 17, (1984) pp. 2529 to 2531.
Journal of Polymer Science, 21, p. 3443.
Journal of Polymer Science, 17, 1943 (1979).
Derwent Jap. Pat. Rep. No. 13, (1971), 22481s, 22482s.

*Primary Examiner*—Joseph L. Schofer
*Assistant Examiner*—Bernard Lipman
*Attorney, Agent, or Firm*—Fisher, Christen & Sabol

[57] ABSTRACT

A method for the surface modification of objects made from polyvinylidene fluoride by dehydrofluorinated of the surface of the objects. The dehydrofluorination is carried out with an etching solution which, in addition to a strong basic compound and a swelling agent and/or solvent for polyvinylidene fluoride, contains an auxiliary agent for the homogenization of the etching solution. The effect of etching is supported by an adhesion promoter. High resistance to shearing and good toughelasticity in composite structure and laminates is achieved.

10 Claims, No Drawings

METHOD FOR THE SURFACE MODIFICATION OF OBJECTS MADE OF POLYVINYLIDENE FLUORIDE

BACKGROUND OF THE INVENTION

1. Field of the Invention

The invention relates to a method for surface modification of objects made of polyvinylidene fluoride and to the use of objects that have thus been modified, together with metals and other polymers, especially with glass-fiber reinforced materials, for the production of composite structures and laminates of high bond strength and shear strength.

2. Prior Art

Polyvinylidene fluoride has a high chemical resistance to inorganic acids, salt solutions and even to strongly oxidizing substances such as chlorine or bromine solutions. Its resistance to chemicals is comparable to that of polytetrafluoroethylene and other perfluorinated polymers. Furthermore, polyvinylidene fluoride can favorably be processed from the melt, extruded into tubes, panels, plates, sheets and other semifinished products and injection molded to give molded parts. Because of these properties polyvinylidene fluoride is a suitable material for the production of chemical containers, vessels, tanks, reactors and pipings, i.e., for any place where chemically aggressive fluids, acids or salt solutions are to be transported and stored. Tubes, pipings, receptacles and vessels made from pure polyvinylidene fluoride, however, often do not have the sufficient stability necessary for the manufacture of chemical appartus and equipment. Therefore, composite materials, for example, of polyvinylidene fluoride and metals or of polyvinylidene fluoride and glass-fiber reinforced polymers such as polyesters or epoxy resins have to be used. Also lacquer coatings with a high content of polyvinylidene fluoride disperson or laminates of polyvinylidene fluoride with polymers are used for the chemical resistant lining of steel tanks, vessels and pipings.

The stability and strength of these composite structures and laminates is, however, affected by the antiadhesive behavior and the almost non-existent adhesion of polyvinylidene fluoride and also by the high coefficient of thermal expansion of the polymer which, in composite structures with metals or glass-fiber reinforced polyester or epoxy resins, causes a separation due to the high shearing forces occuring at high or low temperatures. In order to eliminate these disadvantages, copolymers of polyvinylidene fluoride, for example, with polymethyl methacrylate, have often been used as synthetic resin dispersions for impregnations and coatings. These copolymers, however, do not exhibit the high resistance to chemicals of the pure polyvinylidene fluoride and often have a poor abrasion resistance.

According to other known methods, glass fibers or organic synthetic fibers, such as fibers or fleeces of polyesters or polyamides, are embedded in polyvinylidene fluoride, in order to form bonding centers for the production of laminates and other composite materials. Also specially etched metal oxides or fibers can be used for the production of composite materials by pressure them into the surface of the object made of polyvinylidene fluoride.

Also adhesion-promoting resins, such as dissolved polyurethane or polyalkyl methacrylate, are known which, upon application under heat and in combination with a solvent which swells polyvinylidene fluoride render possible the thermowelding or bonding of polyvinylidene fluoride with metals or with other polymers. The realization of these efforts, i.e., the application of adhesion promoters or adhesives onto the pure polyvinylidene fluoride, results in composite materials which nearly do not resist thermal or mechanical loadings. Furthermore, the pressing of polyester fibers or glass fibers into polyvinylidene fluoride does not yield in products having high composite stabilities and, moreover, represents a complicated method.

Further complicated methods are also known which can be used only on a small scale, for example, grafting of polymethyl methacrylate after radiation with $\gamma$ quants, surface treatments by means of plasma techniques or oxyfluorination with $O_2/F_2$ fumigation.

BROAD DESCRIPTION OF THE INVENTION

The main object of the invention is to provide a method for the surface modification of polyvinylidene fluoride. Other objects and advantages of the invention are set out herein or are obvious herefrom to one skilled in the art.

According to the invention the surfaces of polyvinylidene fluoride objects are dehydrofluorinated. The invention method has the following advantages:

(a) Is easy to carry out at low cost on any technical scale.
(b) Permits a chemical surface modification of polyvinylidene fluoride, especially in regard to hydrophilizing.
(c) Permits the production of extremely stable and shearing resistant composite structures of polyvinylidene fluoride with metals, with glass-fiber reinforced resins of polyesters and epoxy resins and with other polymers.

Preferably the dehydrofluorination is carried out by means of an etching solution which, in addition to a strongly basic compound and a swelling agent and/or solvent for polyvinylidene fluoride, contains at least one auxiliary agent for the homogenization of the etching solution, the auxiliary agent acting at the same time as a solubilizer for the basic compound, and the etching solution is applied onto the surface to be modified by brushing, dipping or spraying. Preferably the auxiliary agent is a cyclic, straight-chain or branched, saturated, if necessary completely or partially fluorinated, monohydric or polyhydric alcohol with 1 to 12 carbon atoms, most preferably 1 to 6 carbon atoms. Preferably, the auxiliary agent is methanol, ethanol, isopropanol, cyclohexanol, ethylene glycol and/or glycerin.

The auxiliary agents are also preferably compounds of the formula:

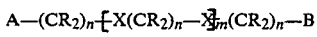

wherein A and B, which can be either identical or different, represent an OR or $NR_2$ group; X is an oxygen atom or an NR group; R residues, which can be either identical or different, represent a hydrogen atom or an alkyl group with 1 to 6 carbon atoms; n is an integer of 1 to 6; and m is an integral of 0 to 50; or cyclic derivatives of the compounds obtained by end-to-end connection via formation of crown ethers, most preferably crown ethers with a total number of 18 atoms and 6 oxygen atoms. Preferably glycols, polyglycols, alkylamino-substituted polyglycols, polyethylene oxides, polypropylene oxides or polyimines, preferably diethylene glycol or triethylene glycol or dialkyl ethylenediamine polyglycols are used as the auxiliary agents.

Preferably, quarternary ammonium hydroxides (known as phase transfer catalysts) or ammonium salts of strong organic acids, most preferably tetrabutylammonium hydroxide, cetyltrimethylammonium hydrogen sulfate, or benzyltriethylammonium bromide, are used as the auxiliary agents.

Preferably hydroxides and/or alcoholates of alkali, alkaline earth or earth metals are used as the strongly basic compounds. The strongly basic components are also preferably sodium hydroxide, potassium hydroxide, or sodium alcoholate or potassium alcoholate of the general formulas $NaOR^1$ and $KOR^1$, wherein $R^1$ represents a straight-chain or branched hydrocarbon group of the general formula $C_nH_{2n+1}$ or a cyclic hydrocarbon group of the general formula $C_nH_{2n-1}$, n being an integer of 1 to 12. Preferably alcoholates of sodium or potassium of the general formula $NaOR^2$ and $KOR^2$, wherein in the formulae $R^2$ contains ether, hydroxy and amino groups in a cyclic, straight-chain or branched hydrocarbon chain, are used as the strongly basic compounds.

Preferably saturated alkylamides, (most preferably dimethyl formamide, dimethyl acetamide, N-methyl pyrrolidone or hexamethyl phosphoric triamide), saturated alkyl carbamides, (most preferably 1,3-dimethyl-3,4,5-tetrahydro-2(1H)-pyrimidinone), dimethyl sulfoxide, phosphoric trialkyl esters or propylene carbonate are used as the solvent for polyvinylidene fluoride.

Subsequent to dehydrofluorination, the surface is preferably coated with an adhesion promoting polymer. Preferably soluble, thermally-curable resins with polar functional groups, such as polyurethanes, epoxy resins, polyacrylates, polyacrylonitrile, polyvinylalcohol copolymers, unsaturated polyester resins, copolymers of polybutadiene/acrylonitrile or copolymers polybutadiene/styrol, are used as adhesion promoting polymers. Preferably, liquid or pasty monomers of two-component resins such as polyurethanes, epoxy resins or polyacrylates are used as adhesion promoting polymers, and the monomers are applied after mixing the components, the polymers being self-curing or curing in the presence of moisture or heat.

Preferably inorganic fillers, such as, pigments, glass fibers, metal oxides, and silicates, and/or organic fillers, such as, fibers, fleeces or fabrics of polyesters, polyamides and polyimides, are embedded into the adhesion promoting polymers.

The invention also includes a method whereby the modified objects in connection with metals and other polymers, especially together with glass-fiber reinforced materials of polyesters and epoxy resins, are used for the production of composite structures and laminates having excellent bond strength (adhesion) and shear strength.

DETAILED DESCRIPTION OF THE INVENTION

The dehydrofluorination reaction of polyvinylidene fluoride is known. To this end, polyvinylidene fluoride powder in dimethyl formamide solution is reacted with a basic substance. Also known is the dehydrofluorination with aqueous sodium or potassium hydroxide in the presence of phase transfer catalysts and under chemical attack by a solution of potassium hydroxide in isopropanol. Such reaction yields in conjugated polyenes which, additionally, may be electronically conductive.

The method according to the invention also covers the use of an etching solution which modifies the surface of the object of polyvinylidene fluoride chemically. This alteration increases the surface energy of the material, eliminates its antiadhesiveness and, therefore, permits bonding and painting and, thus, production of composite structures. According to the invention, this effect is efficiently enhanced by the subsequent application of an adhesion promoter or an adhesive. Polyvinylidene fluoride treated in this manner can be combined with metals or glass-fiber reinforced plastics to give composite structures with a shearing strength of more than 30 $N/mm^2$. Such structures withstand 10 cycles of thermal loading between $+120°$ C. and $-20°$ C. without any critical impairment of the composite stability.

According to the invention, the etching solution for the surface modification of the polyvinylidene fluoride consists of the following components:

(a) In a concentration range of 2 to 60 weight percent, one or more strongly basic compound such as hydroxides of alkali or alkali or alkaline-earth or earth-metals, alcolates of alkali, alkaline-earth or earth-metals.

(b) In a concentration range of 10 to 90 weight percent, one or more solvents which have the ability to solvate or at least to swell polyvinylidene fluoride.

(c) In a concentration rate of 1 to 90 weight percent, one or more solubilizers in the form of additional solvents which dissolve the basic compound, also in the form of surface active compounds or tensides which contribute to the homogenization of the etching solution and improve its efficiency. Preferably, sodium and potassium hydroxides as well as sodium and potassium alcolates are used as the basic reagents. Hydroxides or alcoholates of alkaline earth metals can also be used if they show an appropriate solubility. The concentration range can be between 2 to 60 weight percent, but the optimum concentration is adjusted depending on the other components of the etching bath and on the desired etching effect.

Solvents which swell polyvinylidene fluoride, solvate or in small concentrations, also dissolve it, represent the second important component of the chemical etching solution. Such solvents are known. Suitable solvents are, for example, dimethyl formamide, dimethylacetamide, N-methylpyrrolidone, dimethyl sulfoxide, N,N-propylidenedimethyl carbamate, γ-butyrolactone or hexamethyl phosphoric acid triamide, phosphoric acid trimethyl or triethylesters. But, they can be used only on the condition that they do not react with the basic compounds used, i.e., with hydroxides or alcoholates of sodium or potassium, by which reaction the solution would be decomposed. Most preferably, N-methylpyrrolidone, N,N-propylidenedimethyl carbamate and hexamethyl phosphoric triamide are used for the production of stable etching solutions.

The third essential component of the etching solution can consist in the simplest case of saturated, straight-chain, branched or cyclic hydrocarbon alcohols with 1 to 12 carbon atoms, preferably with 1 to 6 carbon atoms. They serve mainly for the complete dissolution of the hydroxides or alcoholates used and for the homogenization of the etching solution obtained. Examples are ethanol, propanol, butanol, amyl alcohol, isopropanol, isobutanol, neopentyl alcohol, cyclohexanol, etc. According to the invention polyfunctional hydrocarbon alcohols or hydrocarbon ether alcohols, such as glycol, diglycol and/or polyglycols, are most advantageous. They can also preferably be combined with a surface-active aminoalkyl alcohol or with anionic tensides, such as salts of long-chain alkyl sulfonic acids, in order to homogenize the etching solution and to enhance its efficiency. Such auxiliary agents have the general formula:

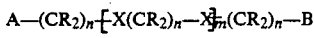

wherein: A and B, which can be either identical or different, are an OR or $NR_2$ group; X is an oxygen atom or an NR group; R residues, which can be either identical or different, are a hydrogen atom or an alkyl group with 1 to 6 carbon atoms; n is an integer of 1 to 6; and m is an integer of 0 to 50. Also, cyclic derivatives of these compounds obtained by end-to-end connection via formation of crown ethers, preferably crown ethers with a total number of 18 atoms and 6 oxygen atoms, can be used. Furthermore, an addition of small amounts of organic tetraalkylammonium salts (known as phase transfer catalysts) can result in an increased aggressivity and etching effect of the solution by cation complexing of the alkali and alkaline-earth metal bases used.

According to the invention, by use of cationically complexing dialkylethylenediamino polyglycols as solubilizers the efficiency is significantly improved. If a polypropylene oxide modified dialkylethylenediamine of the generaly formula:

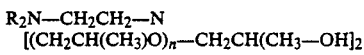

is used as the homogenizing agent, good surface modifications and etching efficiencies after a reaction time of 15 seconds at 50° C. can be achieved. As a further auxiliary agent, completely or partially fluorinated compounds of the types described above can be used if they are stable against strong bases and do not cause decomposition of the solution by secondary reactions. Preferably, perfluorinated derivatives of glycols or polyglycols can be used.

According to the invention, with etching solutions of the following composition,
Base: 2 to 60 weight percent
Solvent solvating or swelling polyvinylidene fluoride: 10 to 90 weight percent
Auxiliary agent, one or more components: 1 to 90 weight percent
with cationically complexing solubilizers or additives, good etching efficiencies after reaction times as short as 15 to 60 seconds at a temperature of 50° C. can be achieved. Less strong, but for the production of composite structures very, suitable etching effects are obtained with alcoholic or glycolic solubilizers. In such cases, etching times of 1 to 20 minutes at reaction temperatures of 30° to 80° C. can be applied.

According to the invention, the effect of the etching solution is effectively supported by the subsequent application of an adhesion promoting resin. The adhesion promoter has the following effects:

(a) Fast curing of the chemically reactive centers provided by the etching solution and prevention of a possible deactivation by environmental factors or handling.

(b) Making available enough own polar chemical groups which can be connected with metals, glass-fiber reinforced polyester or epoxy resins or other polymers and which, therefore, multiply the etching effect.

(c) Rendering possible the production of composite structures of high resistance to shearing and good elasticity by compensating and resisting the high shearing stresses generated by temperature changes.

According to the invention, soluble thermoplastic or soluble thermally curing thermosetting resins can be used as adhesion promoters. Also suitable are liquid or pasty monomers or aligomers of two-component resins which are generally used in adhesives. For the production of stable composite structures, polyurethanes, epoxy resins or polyacrylates also in suitable mixtures as homopolymers or copolymers can also be used. Moreover, copolymers of polybutadieneacrylonitrile or polybutadienestyrene, and completely or partially saponified copolymers of polyvinyl acetate can be used. Thermally crosslinking polymers of nitrile rubber, copolymers of ethylenevinyl acetate or polyvinyl butyral resins are preferably applied as soluble adhesion promoters. Also polyurethane coatings which cure in the presence of moisture can be used as adhesion promoters.

Thermosettying adhesion promoters, preferably epoxy resins, permit high resistances to shearing of composite structures to be obtained together with metals or glass-fiber reinforced resins of more than 30 $N/mm^2$ with corresponding thermal stability between $+120°$ and $-20°$ C.

In order to achieve a further increase of stability and rigidity of the adhesion promoting layer preferably organic polymer fibers are embedded therein. For example, fibers, fleeces or fabrics of polyesters, polyamides (Nylon), polyimides (Aramid or Kevlar) or of carbon are suitable for this purpose.

As described, the method of the invention is especially suitable for the production of composite structures or laminates, which exhibit a high adhesive, bond strength and resistance to shearing from polyvinylidene fluoride and metals or other polymers, especially in connection with glass-fiber reinforced polyester and epoxy resins. The method of the invention thus is of great importance in chemical engineering and in all fields, where polyvinylidene fluoride is used as vessel aligning, for pump parts or pipings, which are in contact with aggressive chemical substances, acids or salt solutions. Production of copolymers, thus, is no longer necessary. The method according to the invention can also be used for surface hydrophilizing, coating or painting of objects, such as panels, sheets, plates, films, membranes or pipings, made from polyvinylidene fluoride.

As used herein, all parts, percentages, ratios and preparations are on a weight basis unless otherwise stated herein or otherwise obvious herefrom to one skilled in the art.

EXAMPLE 1

A solid, extruded workpiece of polyvinylidene fluoride is etched with a solution consisting of 10 g of potassium hydroxide, 50 g of isopropanol and 40 g of N-methylpyrrolidone. Etching is carried out for 10 minutes at temperatures between 50° and 80° C. After washing and drying, a solution of a polyurethane resin is applied as the adhesion promoter onto the etched, russet-colored surface of the workpiece and heated up for 15 minutes to approximately 150° C. The workpiece is then covered with a glass fiber-reinforced polyester resin and shows a shearing strength of 24 $N/mm^2$.

EXAMPLE 2

The method of example 1 is repeated, but a mixture consisting of 2 g of potassium-tert.butylate, 49 g of diethylene glycol and 49 g of N-methylpyrrolidone is used as the etching solution and a soluble epoxy resin is used as the adhesion promoter. The workpiece thus-treated is subsequently covered with a glass fiber-reinforced polyester resin. The shearing strength of the resultant workpiece is 30 to 35 N/mm$^2$.

EXAMPLE 3

The method of Example 2 is repeated, but polyvinyl butyral is used as the adhesion promoter. The composite product thus-obtained with a glass fiber-reinforced polyester shows a shearing strength of 32 to 33 N/mm$^2$.

EXAMPLE 4

Two plates of polyvinylidene fluoride are etched by means of a liquid consisting of 8 g of potassium-tert.butylate, 40 g of dimethylethylenediaminopolypropylene oxide and 52 g of N-methylpyrrolidone for more than 1 minute and at 50° C. After washing and drying, the plates show a weakly russet color. Onto one of the surface treated plates, a two-component acrylate adhesive is applied; and, in the other case, a one-component epoxy adhesive curing at 150° C. is applied. A steel plate is fixed on the plate treated with acrylate adhesive and an aluminum plate is placed on the plate treated with epoxy adhesive. The resultant composite materials exhibit shearing strengths of 32 to 35 N/mm$^2$ and 35 to 40 N/mm$^2$, respectively.

What is claimed is:

1. Method for the surface modification of objects made of polyvinylidene fluoride, especially for achieving bonding and hydrophilizing properties and for the producton of composite structures, comprising dehydrofluorinating the surface of the objects with an etching solution which contains one or more alkali metal alcoholates and/or alkali metal hydroxides and one or more swelling agent and/or solvent for polyvinylidene fluoride and at least one auxiliary agent for the homogenization and stabilization acting at the same time as a solubilizer for the alcoholate and the hydroxide, the auxiliary agent being a compound of the formula:

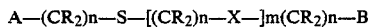

A—(CR$_2$)n—S—[(CR$_2$)n—X—]m(CR$_2$)n—B wherein A and B, which can be either identical or different, represent an OR or NR$_2$ group; X is an oxygen atom or an NR group; R residues, which can be either identical or different, represent a hydrogen atom or an alkyl group with 1 to 6 carbon atoms; n is an integer of 1 to 6; and m is an integer of 0 to 50.

2. Method as claimed in claim 1 wherein the auxiliary agent is a glycol, a polyglycol, an alkyl-amino-substituted polyglycol, a polyethylene oxide, a polypropylene oxide or a polyimine.

3. Method as claimed in claim 2 wherein the auxiliary agent is diethylene glycol, triethylene glycol or a dialkyl ethylenediamine polyglycol.

4. Method as claimed in claim 1 wherein the auxiliary aent is a cyclic derivative of said compound obtained by end-to-end connection via formation of crown ethers with a total of 18 ring atoms and 6 oxygen atoms, whereby A and B are one single oxygen atom or a NR group.

5. Method for the surface modification of objects made of polyvinylidene fluoride, especially for achieving bonding and hydrophilizing properties and for the production of composite structures, comprising dehydrofluorinating the surface of the objects with an etching solution which contains one or more alkali metal alcoholate and/or alkali metal hydroxide and one or more swelling agent and/or solvent for polyvinylidene fluoride and at least one auxiliary agent for the homogenization and stabilization acting at the same time as a solubilizer for the alcoholate and the hydroxide, the auxiliary agent being a cyclic, straight-chain or branched, saturated, if necessary completely or partially fluorinated, polyhydric alcohol having 1 to 12 carbon atoms.

6. Method as claimed in claim 5 wherein the auxiliary agent is ethylene glycol and/or glycerin.

7. Method for the surface modification of objects made of polyvinylidene fluoride, especially for achieving bonding and hydrophilizing properties and for the production of composite structures, comprising dehydrofluorinating the surface of the objects with an etching solution which contains one or more alkali metal alcoholate and/or alkali metal hydroxide and one or more swelling agent and/or solvent for polyvinylidene fluoride and at least one auxiliary agent for the homogenization and stabilization acting at the same time as a solubilizer for the alcoholate and the hydroxide, the auxiliary agent being a cylic, straight-chain or branched, saturated monohydrid alcohol having 3 to 12 carbon atoms, whereby said one or more swelling agent and/or solvent N-methylpyrrolidone, hexamethyl phosphoric triamide and/or 1,3-dimethyl-3,4,5-tetrahydro-2(1H)-pyrimidinone is used.

8. Method as claimed in claim 1, 5 or 7 wherein the one or more sodium alcoholate or potassium alcoholate of the general formulas NaOR$^1$ and KOR$^1$ is used, wherein R$^1$ represents a straight-chain or branched hydrocarbon group of the general formula C$_n$H$_{2n+1}$ or a cyclic hydrocarbon group of the general formula C$_n$H$_{2n+1}$, n being an integer of 1 to 12.

9. Method as claimed in claim 1, 5, or 7 wherein the one or more sodium alcoholate or potassium alcoholate of the general formula NaOR$^2$ and KOR$^2$ are used, wherein R$^2$ contains ether, hydroxy and amino groups in a cyclic, straight-chain or branched hydrocarbon chain.

10. Method as claimed in claim 1, or 5 wherein the one or more swelling agent and/or solvent is N-methylpyrrolidone, hexamethyl phosphoric triamide and/or 1,3-dimethyl-3,4,5-tetrahydro-2(1H)-pyrimidinone.

* * * * *